US006545374B1

(12) United States Patent
Allenbach

(10) Patent No.: US 6,545,374 B1
(45) Date of Patent: Apr. 8, 2003

(54) POWER TRANSFER DEVICE INSTALLABLE IN A POWER METER RECEPTACLE

(76) Inventor: Michael E. Allenbach, 1003 W. Prospect, Seattle, WA (US) 98119

( * ) Notice: Subject to any disclaimer, the term of this patent is extended or adjusted under 35 U.S.C. 154(b) by 131 days.

(21) Appl. No.: 09/643,229

(22) Filed: Aug. 22, 2000

Related U.S. Application Data

(60) Provisional application No. 60/156,623, filed on Sep. 27, 1999.

(51) Int. Cl.[7] .......... H01H 47/00; H02B 1/26

(52) U.S. Cl. .......... 307/125; 361/641

(58) Field of Search .......... 307/125, 64, 43, 307/65, 70; 361/641

(56) References Cited

U.S. PATENT DOCUMENTS

| | | | | |
|---|---|---|---|---|
| 2,249,075 A | | 7/1941 | Young et al. | 324/74 |
| 2,606,232 A | | 8/1952 | St. John | 361/661 |
| 3,549,951 A | | 12/1970 | Plummer | 361/668 |
| 3,599,047 A | | 8/1971 | Magarian | 361/661 |
| 3,643,209 A | | 2/1972 | Coston | 439/517 |
| 3,654,484 A | | 4/1972 | Jorgenson et al. | 307/149 |
| 4,258,968 A | | 3/1981 | Holt | 439/108 |
| 4,368,943 A | | 1/1983 | Davis et al. | 439/517 |
| 4,977,482 A | | 12/1990 | Langdon et al. | 361/661 |
| 5,045,969 A | | 9/1991 | Menasco | 361/672 |
| 5,088,004 A | | 2/1992 | Howell | 361/669 |
| 5,146,385 A | * | 9/1992 | Misencik | 361/56 |
| 5,596,468 A | | 1/1997 | Allina | 361/56 |
| 5,761,027 A | * | 6/1998 | Flegel | 361/664 |
| 6,107,701 A | * | 8/2000 | Flegel | 307/125 |
| 6,188,145 B1 | * | 2/2001 | Stewart | 307/125 |
| 6,365,990 B2 | * | 4/2002 | Flegel | 307/64 |

* cited by examiner

*Primary Examiner*—Edward H. Tso
*Assistant Examiner*—Pia Tibbits
(74) *Attorney, Agent, or Firm*—Christensen O'Connor Johnson Kindness PLLC

(57) ABSTRACT

A power transfer device plugs into a standard power meter box and a power meter plugs into the transfer device. Power transfer is accomplished by a lever operated plate which operates two circuit breakers in unison. The conductors in the transfer device are primarily bus bars. The circuit breakers may be replaced by switches and overload protection devices and a power meter may be built into the power transfer device.

21 Claims, 4 Drawing Sheets

POWER TRANSFER DEVICE INSTALLABLE IN A POWER METER RECEPTACLE

CROSS-REFERENCE TO RELATED APPLICATION

This application claims the benefit of U.S. Provisional Patent Application No. 60/156,623, filed Sep. 27, 1999.

FIELD OF THE INVENTION

The subject invention is in the field of electrical switches, switching systems and overload protection devices. In particular, it is in the field of apparatus for disconnecting an electrical system from one source of power and connecting it to another and vice versa, a primary example being disconnecting the electrical system of a building from the electrical utility power supply and connecting to an auxiliary generator power supply.

BACKGROUND OF THE INVENTION

Apparatus for disconnecting an electrical system from one source of power and connecting it to another, and vice versa, is widely used in boats, home, factories, hospitals and the like. In the majority of installations of such switching, the switching is implemented by adding wiring and switches to the electrical power system. However, installations which incorporate an electrical utility meter which is plugged into a receptacle offer the possibility of implementing the power supply switching with a minimum of wiring. The control apparatus disclosed in U.S. Pat. No. 3,654,484, issued Apr. 4, 1972 to Jorgensen et al., is an example of power supply switching which takes advantage of the possibility. The Jorgensen et al. apparatus plugs into the utility meter plug and the utility meter is plugged into the apparatus. The apparatus comprises a receptacle for plugging in a connector from an auxiliary power supply and a switch which connects the electrical system to either the utility power supply or the auxiliary power supply. The Jorgensen et al. apparatus was marketed by the Onan Corporation under size and costs constraints which rendered the apparatus economically and practically feasible. However, because of these restraints, the switching in the Onan product did not meet utility standards in terms of safety, reliability, longevity and overload protection.

The present invention is directed to an apparatus that meets these needs and other shortcomings in the prior art.

SUMMARY OF THE INVENTION

The subject invention is a power transfer device that plugs into a power meter receptacle. The device may further comprise a power meter or a receptacle for a power meter. Utility system power flows into the device from the power meter receptacle (box). It also comprises a receptacle for plugging in an alternate or auxiliary power supply. Electrical conductors, preferably bus bars, conduct power from the utility systems through the meter and into the served system or from the auxiliary power socket into the served system. The device also comprises switches for connecting one or the other power supply to the served electrical system. In a preferred embodiment, the switches are commercially available circuit breakers. The invention can also be implemented using switches and overload protection devices, such as fuses.

A mechanism is provided for operating both switches in unison and may allow an off position in which neither switch is on.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
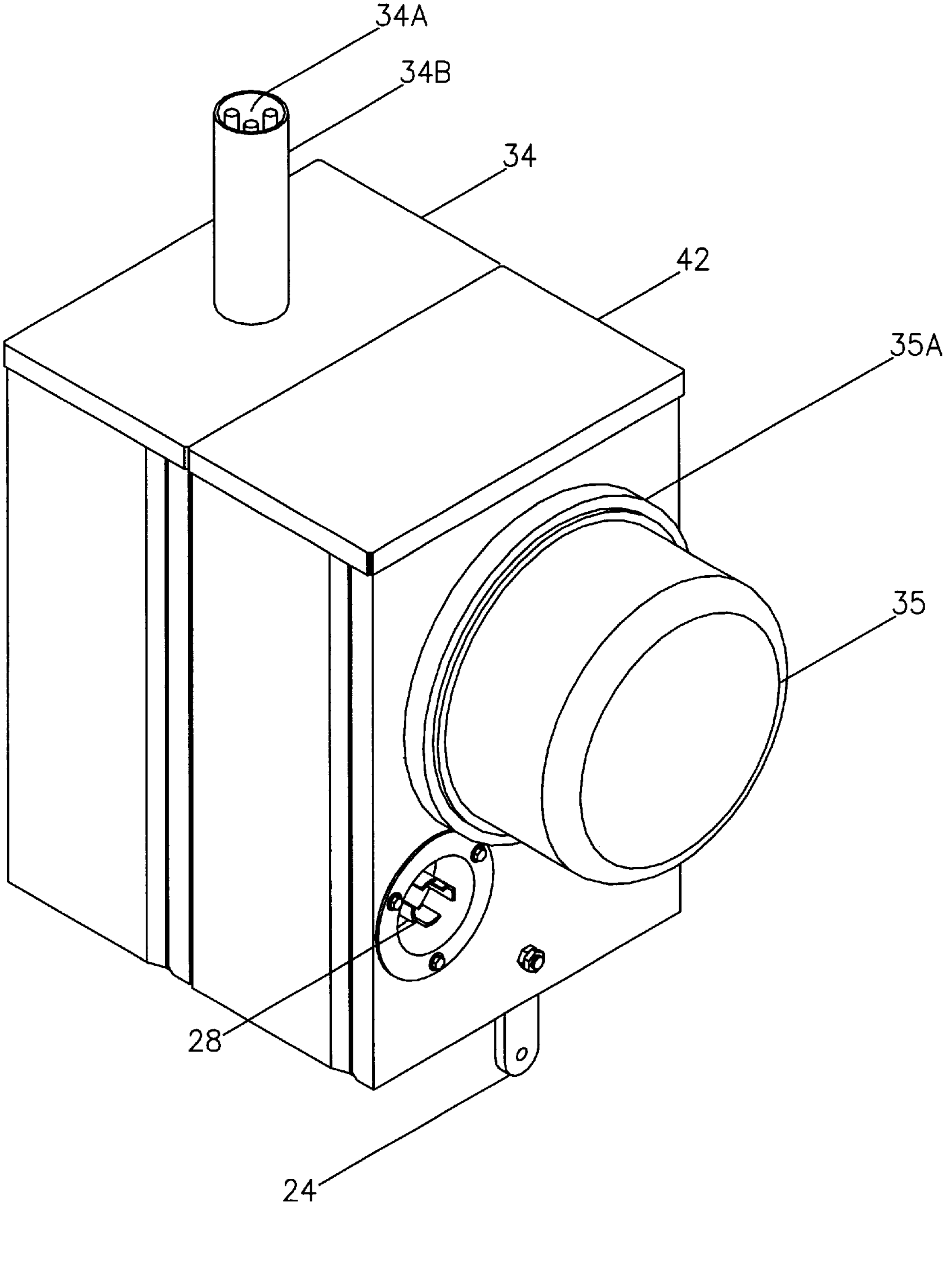
FIG. 1 is a general view of one embodiment of the subject invention installed on a standard power meter box.

The subject invention is a power transfer device that, in one embodiment, plugs into a power meter receptacle. The device may further comprise a receptacle for a power meter. FIG. 1 is a general view of one embodiment 42 of the subject invention installed on a standard power meter box 34. Socket 34A in fitting 34B receives power from a utility system. Socket 28 is an auxiliary power inlet. Lever 24 is used to operate the transfer switch. Power meter 35 is plugged into meter socket 35A in the transfer device.

Figure 2:
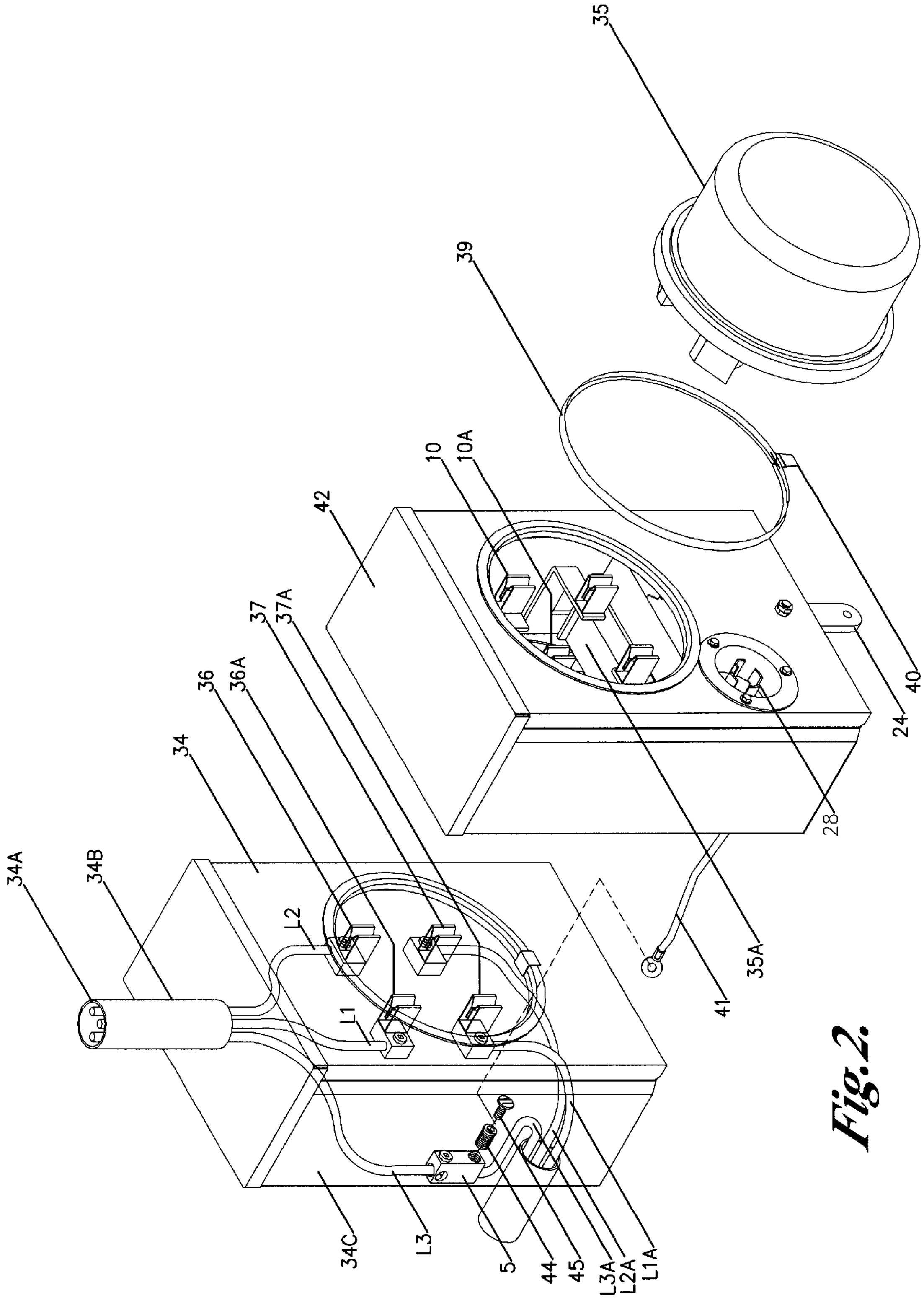
FIG. 2 is an exploded view of the components of the FIG. 1 embodiment with the housing of the standard power meter box transparent to show details.

FIG. 2 is an exploded view of the components of the FIG. 1 embodiment with the housing 34C of meter box 34 transparent to show details. Conductors L1 and L2 feed power to meter jaws 36 and 36A. Conductor L3 is the neutral wire and is connected to neutral/ground bus 5. Conductor L3A is connected to the ground bus and extends into the served electrical system.

Set screw 44 serves to retain conductor L3A in the neutral bus and has a threaded hole in the bottom of its hex socket to enable use of screw 45 to connect ground wire 41 of the transfer switch to the neutral/ground system of the served system. Conductors L1A and L2A are connected to jaws 37 and 37A and carry power into the served system.

Meter ring 39 is used to retain the power meter on the transfer device and is locked in place by seal 40.

Figure 3:
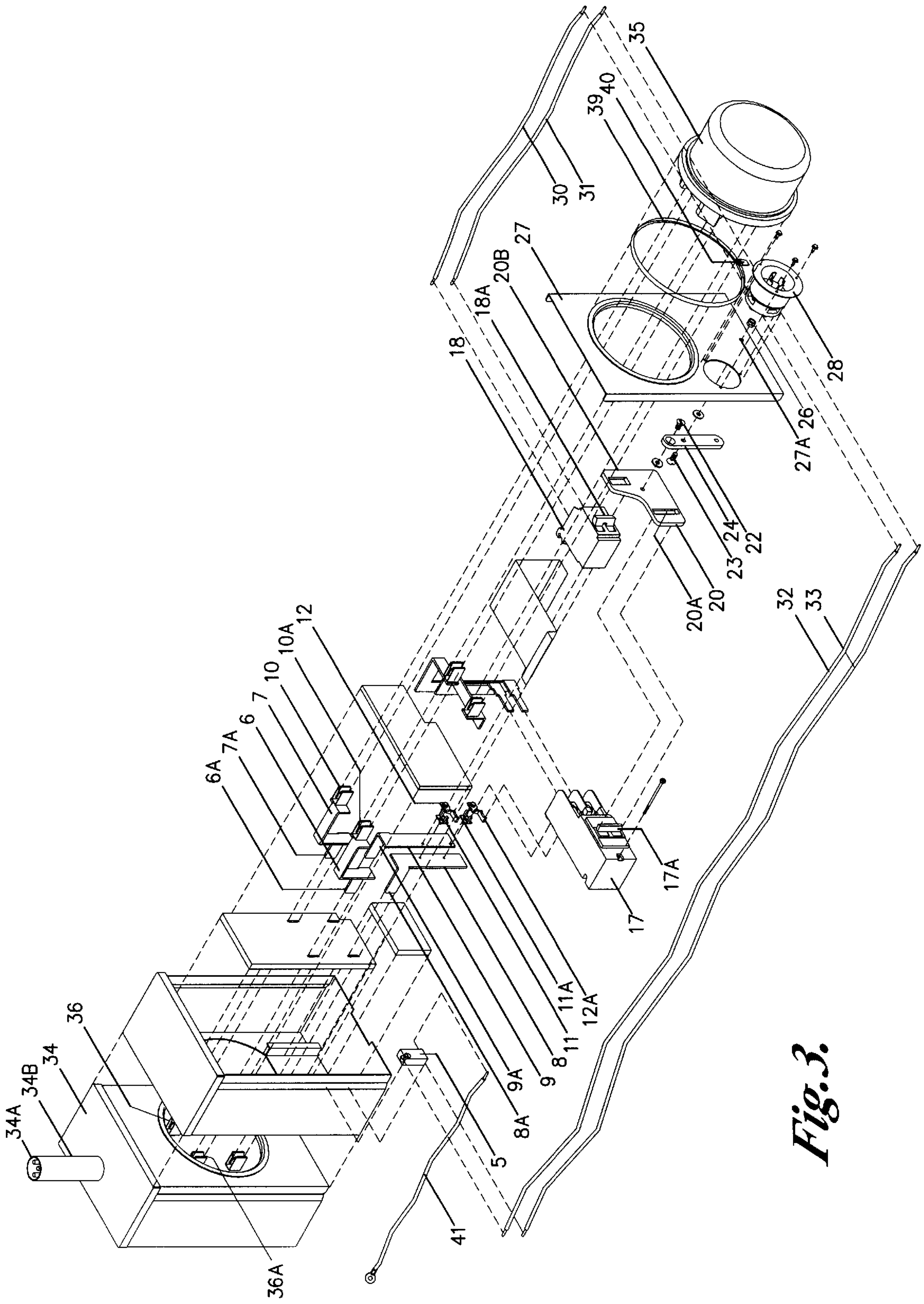
FIG. 3 is an exploded view of a preferred embodiment of the subject transfer switch.

FIG. 3 is an exploded view of a preferred embodiment of the transfer switch with some parts numbered as in FIG. 2. Blade 6A on utility input bus bar 6 and blade 7A on utility input bus bar 7 engage jaws 36A and 36, respectively. Blade 8A on output bus bar 8 and blade 9A on output bus bar 9 engage jaws 37A and 37, respectively.

Figure 3A:
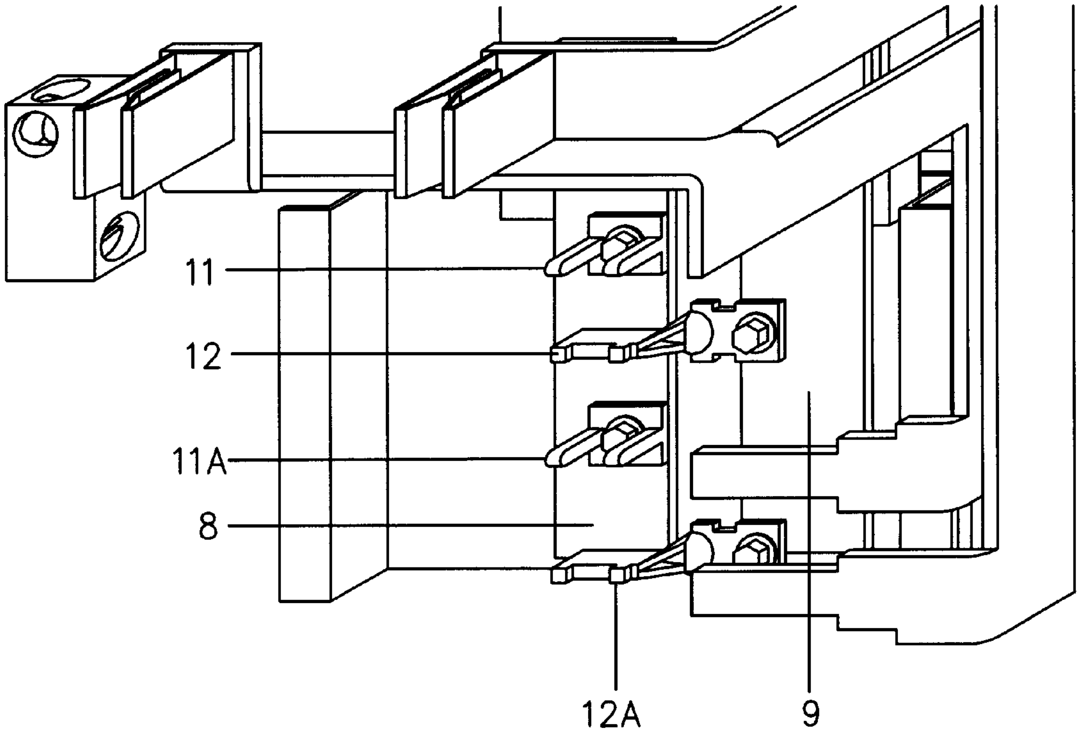
FIG. 3A is an enlarged view showing installation of circuit breaker stabs in detail.

Breaker stabs 11, 11A, 12, and 12A are electrical connectors which are provided with circuit breakers. Stabs 11 and 12 connect bus bars 8 and 9, respectively, to circuit breaker 18 and stabs 11A and 12A connect bus bars 8 and 9, respectively, to circuit breaker 17. Specifically, stabs 11 and l A are connected to bus bar 8 and stabs 12 and 12A are connected to bus bar 9. The installation of these stabs is shown in detail in FIG. 3A with parts numbered as in FIG. 3. Each circuit breaker has an off state and an on state.

Slot 20A in part 20 engages lever 17A of circuit breaker 17. Slot 20B in part 20 engages lever 18A of circuit breaker 18. Part 20 is moved laterally by lever 24 and is connected to the lever by screw 22. The lever is pivoted on screw 23 which fits through hole 27A in face plate 27 and is retained by nut 26. The motion of part 20, called the interlock plate, is arcuate. Slots 20A and 20B are long enough to allow for the radial component and the circumferential motion of the interlock plate provides the lateral motion which actuates the circuit breakers.

Conductors 30 and 31 connect power terminals in socket 28 to circuit breaker 18. Conductors 32 and 33 connect the neutral/ground terminal in socket 28 to neutral/ground bus 5.

In normal (non-emergency) use, circuit breaker 17 is on (conducting), circuit breaker 18 is off (non-conducting) and power from the utility flows via the jaws, blades and bus bars described above through the transfer device, through the meter and back through the transfer device and circuit breakers 17, through the meter base into the served system.

In emergency use, circuit breaker 17 is off and circuit breaker 18 is on. Power flows from socket 28 through conductors 30 and 31 to circuit breaker 18 and then through bus bars, blade and jaws to conductors L1A and L2A and thereby into the served system. The ground/neutral terminal is connected to conductor L3A via conductors 32 and 33 and neutral bus 5. Auxiliary power is not metered by the meter.

In alternate embodiments of the subject invention, a power meter may be incorporated in the device rather than being plugged into it and/or the circuit breakers may be replaced with non circuit breaker switches, in combination with overload protection devices, such as fuses.

The present invention provides a power transfer device that accommodates a power meter and meets marketing constraints in terms of size, cost, safety, reliability, and longevity and also provides overload protection. Meeting the constraints is enabled by the use of proven, commercially available circuit breakers as the switching means and the use of bus bars instead of wiring to optimize power carrying capability relative to the space required.

It is also considered to be understood that while one embodiment of the invention is disclosed herein, other embodiments and modifications of the one described may fall within the scope of the invention which is limited only by the attached claims.

What is claimed is:

1. In a system including a served electrical system and a utility power source connected to a utility power meter receptacle, a power transfer device for conducting electrical power to the served electrical system via the utility power meter receptacle, comprising:

(a) a first power input installable in the utility power meter receptacle and configured to receive electrical power from the utility power source;

(b) a second power input configured to receive electrical power from an auxiliary power source;

(c) first and second switching devices, each switching device having a conducting and a non-conducting state, the first switching device in electrical communication with the first power input and the second switching device in electrical communication with the second power input;

(d) first and second overload protection devices in electrical communication with the first and second switching devices, respectively;

(e) first circuitry configured to electrically connect the utility power source to the served electrical system through the first power input, the first switching device, and the first overload protection device;

(f) second circuitry configured to electrically connect the auxiliary power source to the served electrical system through the second power input, the second switching device, and the second overload protection device; and (g) an actuator for actuating the first and second switching devices such that when one switching device is in a conducting state, the other switching device is in a non-conducting state.

2. The power transfer device of claim 1, in which at least the first circuitry or second circuitry includes a bus bar for conducting electrical power within the power transfer device.

3. The power transfer device of claim 1, in which at least one of the first and second overload protection devices is a fuse.

4. The power transfer device of claim 1, in which the power transfer device includes a state in which the first and second switching devices are both in a non conducting state.

5. The power transfer device of claim 4, in which the first and second switching devices are both configured to be in a non conducting state when the power transfer device transitions from one switching device being in a conducting state to the other switching device being in a conducting state.

6. The power transfer device of claim 1, in which the power transfer device further comprises a receptacle configured to receive a utility power meter, the receptacle having electrical contacts in electrical communication with the first power input and the served electrical system.

7. The power transfer device of claim 1, in which the power transfer device further comprises a utility power meter connected to the first power input and the served electrical system when the first switching device is in a conducting state, the utility power meter being configured to measure power being supplied to the served electrical system from the utility power source.

8. The power transfer device of claim 1, in which the actuator mechanically engages the first and second switching devices to physically cause the switching devices to enter the conducting or non conducting state.

9. A power transfer device for conducting electrical power to a served electrical system, comprising (a) a first power input installable in a utility power meter receptacle that receives electrical power from a utility power source;

(b) a second power input configured to receive electrical power from an auxiliary power source;

(c) first and second circuit breakers, each circuit breaker having a conducting and a non-conducting state and circuit overload protection, the first circuit breaker in electrical communication with the first power input and the second circuit breaker in electrical communication with the second power input;

(d) first circuitry configured to electrically connect the utility power source to the served electrical system through the first power input and the first circuit breaker;

(e) second circuitry configured to electrically connect the auxiliary power source to the served electrical system through the second power input and the second circuit breaker; and (f) an actuator for actuating the first and second circuit breakers such that when one circuit breaker is in a conducting state, the other circuit breaker is in a non-conducting state.

10. The power transfer device of claim 9, in which at least the first circuitry or second circuitry includes a bus bar for conducting electrical power within the power transfer device.

11. The power transfer device of claim 9, in which the power transfer device includes a state in which the first and second circuit breakers are both in a non conducting state.

12. The power transfer device of claim 11, in which the first and second circuit breakers are both configured to be in a non conducting state when the power transfer device transitions from one circuit breaker being in a conducting state to the other circuit breaker being in a conducting state.

13. The power transfer device of claim 9, in which the power transfer device further comprises a receptacle configured to receive a utility power meter, the receptacle having electrical contacts in electrical communication with the first power input and the served electrical system.

14. The power transfer device of claim 9, in which the power transfer device further comprises a utility power meter connected to the first power input and the served electrical system when the first circuit breaker is in a conducting state, the utility power meter being configured to measure power being supplied to the served electrical system from the utility power source.

15. The power transfer device of claim 9, in which the actuator mechanically engages the first and second circuit breakers to physically cause the circuit breakers to enter the conducting or non conducting state.

16. In a system that serves power to an electrical system, a method of transferring service of power from a utility to an auxiliary power source, comprising:

(a) installing a first power input in a utility power meter receptacle that receives electrical power from the utility;

(b) connecting a second power input to the auxiliary power source;

(c) providing first and second switching devices, each switching device having a conducting and a non-conducting state, the first switching device being in electrical communication with the first power input and the second switching device being in electrical communication with the second power input;

(d) providing first and second overload protection devices in electrical communication with the first and second switching devices, respectively;

(e) providing first circuitry that connects the utility to the served electrical system through the first power input, the first switching device, and the first overload protection device;

(f) providing second circuitry that connects the auxiliary power source to the served electrical system through the second power input, the second switching device, and the second overload protection device;

(g) providing an actuator that actuates the first and second switching devices such that when one switching device is in a conducting state, the other switching device is in a non-conducting state; and (h) actuating the actuator to cause the first switching device to transition from a conducting state to a non-conducting state and the second switching device to transition from a non-conducting state to a conducting state.

17. The method of claim 16, further comprising actuating the actuator to cause the first switching device to transition to a non-conducting state before the second switching device transitions to a conducting state.

18. The method of claim 16, further comprising:

(a) providing a receptacle configured to receive a utility power meter, the receptacle having electrical contacts in electrical communication with the first power input and the served electrical system; and (b) installing a utility power meter into the receptacle such that power flows from the first power input through the meter to the served electrical system when the first switching device is in a conducting state.

19. In a system that serves power to an electrical system, a method of transferring service of power from a utility to an auxiliary power source, comprising:

(a) installing a first power input in a utility power meter receptacle that receives electrical power from the utility;

(b) connecting a second power input to the auxiliary power source;

(c) providing first and second circuit breakers, each circuit breaker having a conducting and a non-conducting state and circuit overload protection, the first circuit breaker in electrical communication with the first power input and the second circuit breaker in electrical communication with the second power input;

(d) providing first circuitry that connects the utility to the served electrical system through the first power input and the first circuit breaker;

(e) providing second circuitry that connects the auxiliary power source to the served electrical system through the second power input and the second circuit breaker;

(f) providing an actuator that actuates the first and second circuit breakers such that when one circuit breaker is in a conducting state, the other circuit breaker is in a non-conducting state; and (g) actuating the actuator to cause the first circuit breaker to transition from a conducting state to a non-conducting state and the second circuit breaker to transition from a non-conducting state to a conducting state.

20. The method of claim 19, further comprising actuating the actuator to cause the first circuit breaker to transition to a non-conducting state before the second circuit breaker transitions to a conducting state.

21. The method of claim 19, further comprising:

(a) providing a receptacle configured to receive a utility power meter, the receptacle having electrical contacts in electrical communication with the first power input and the served electrical system; and (b) installing a utility power meter into the receptacle such that power flows from the first power input through the meter to the served electrical system when the first circuit breaker is in a conducting state.

* * * * *